United States Patent [19]
Johnson

[11] 3,837,740
[45] Sept. 24, 1974

[54] PHOTO PROJECTION DRAWING BOARD

[76] Inventor: Daniel E. Johnson, 1711 Wisconsin, Marysville, Mich. 48040

[22] Filed: Jan. 20, 1972

[21] Appl. No.: 219,319

[52] U.S. Cl. .................................. 353/122, 353/98
[58] Field of Search .......................... 353/74–78, 353/44, 98, 99, 122, 169; 350/121, 123; 352/243; 95/86; 33/20 R

[56] References Cited
UNITED STATES PATENTS

| | | | |
|---|---|---|---|
| 1,306,861 | 6/1919 | Sparkes | 353/44 |
| 1,633,253 | 6/1927 | Holst | 353/44 |
| 2,364,363 | 12/1944 | Howell | 95/86 |
| 2,773,420 | 12/1950 | Nistri | 353/5 |
| 3,046,835 | 7/1962 | Richards | 353/44 |
| 3,283,652 | 11/1966 | Busch | 353/77 |
| 3,332,317 | 7/1967 | Deckman et al | 353/44 |
| 3,479,115 | 11/1969 | Lindsay | 353/6 |

FOREIGN PATENTS OR APPLICATIONS

| | | | |
|---|---|---|---|
| 664,164 | 6/1963 | Canada | 353/44 |
| 898,397 | 11/1953 | Germany | 353/243 |
| 512,183 | 8/1939 | Great Britain | 353/79 |

*Primary Examiner*—Harry N. Haroian
*Attorney, Agent, or Firm*—Harness, Dickey & Pierce

[57] ABSTRACT

An apparatus for displaying a photograph projected onto a work surface for purposes of reproduction, the apparatus comprising a mirrored surface for reflecting a photographic image from the projector to a transparent screen located in the top of a worktable, and including a remotely movable carriage supporting the projector and selectively locatable relative to the mirrored surface whereby the projected image may be selectively scaled and rectified on the screen. For remotely effecting movement of the projector carriage and/or the projector, a manually actuatable control box is located on or adjacent the work surface of the table in order to obviate the need for manual adjustment.

1 Claim, 7 Drawing Figures

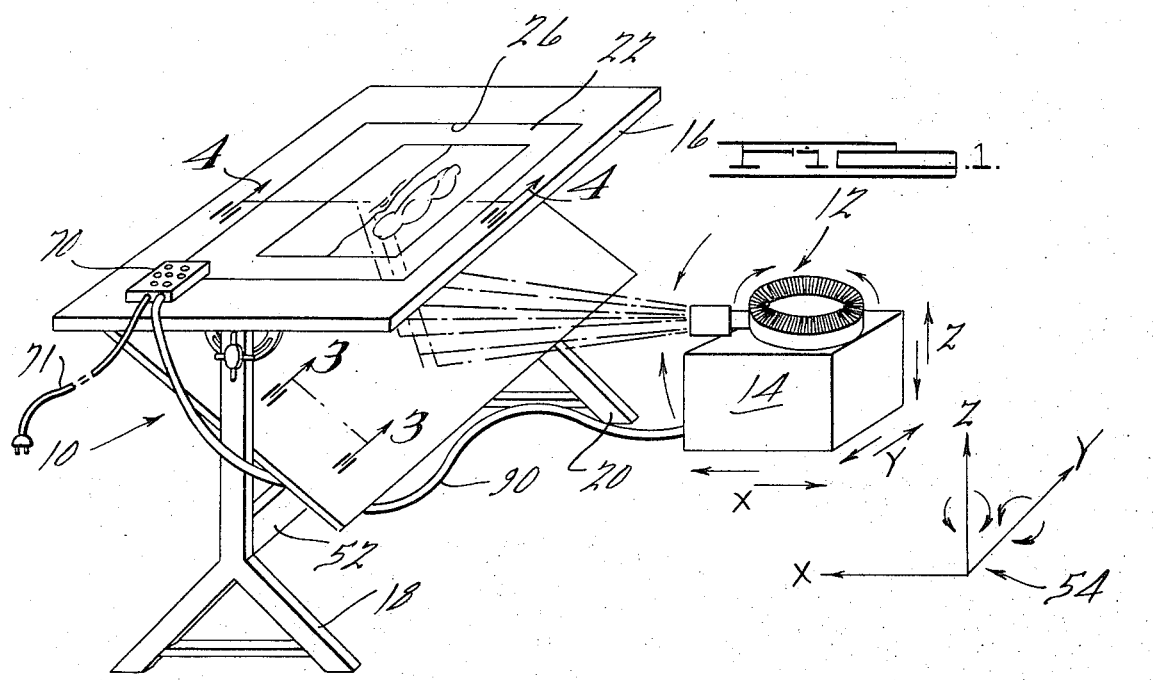
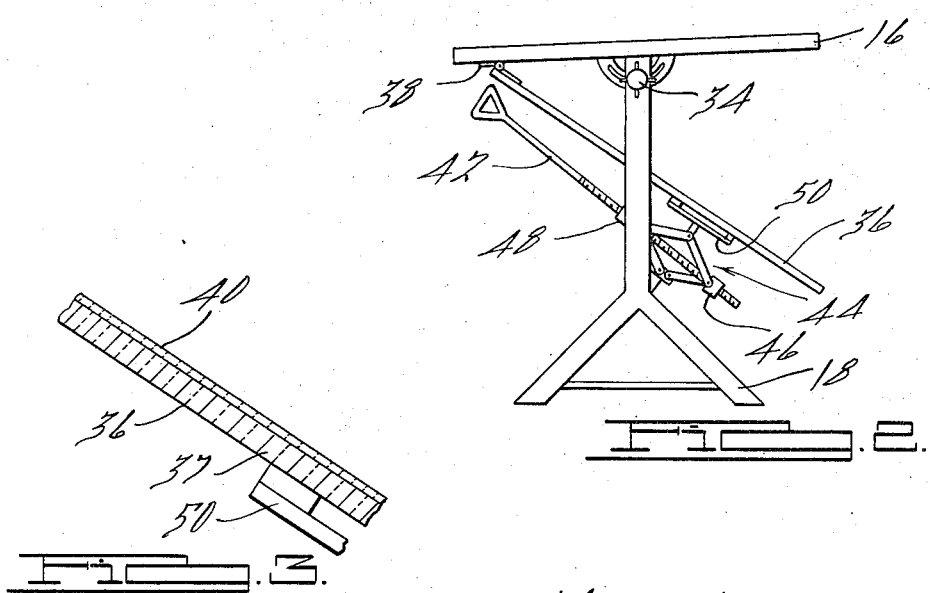
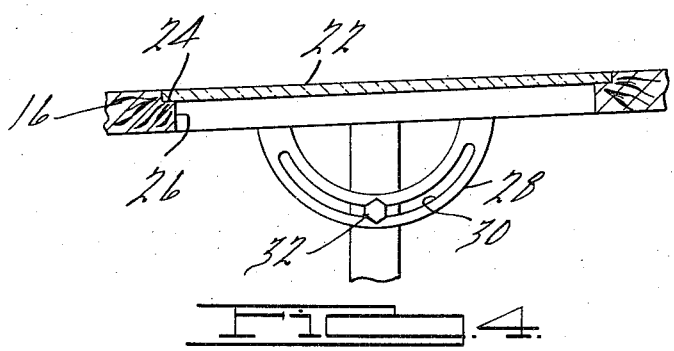

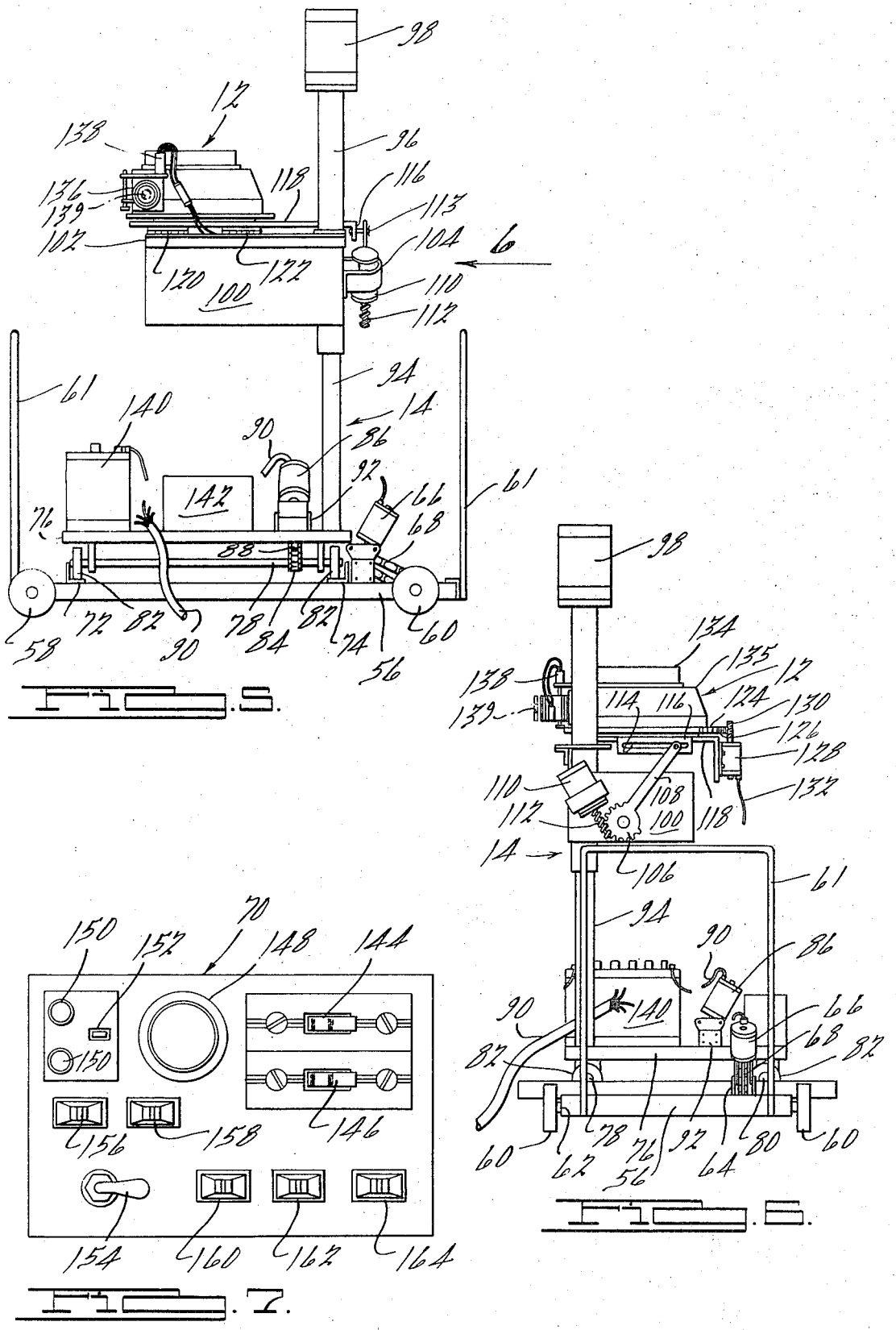

PHOTO PROJECTION DRAWING BOARD

BACKGROUND AND SUMMARY OF THE INVENTION

This disclosure pertains generally to the field of photogrammetry, and more particularly to a photograph projection drawing board including a remotely located projector disposed on a selectively movable carriage adapted to accurately display and rectify a photographic image projected onto a viewing screen, whereby the image may be reproduced without distortion and at an appropriate scale by means of tracing, employment of a light sensitive paper, or other well-known reproductive technique.

Aerial photographs have been found to be a highly expedient technique in planning highways, railroads, pipelines and the like. In transferring the information from an aerial photograph onto suitable alignment sheets or other workable drawings, economy can be achieved if the photograph is displayed at a suitable scale and rectified in such a manner enabling a draftsman to directly trace the photograph or alternatively accomplishing a direct transfer by means of a light sensitive paper. It is therefore the primary object of the subject invention to provide apparatus suitable for displaying a photograph at a selective scale on a working surface of a drafting table.

In displaying a photograph it has been found that certain portions of the photograph may be distorted due to the physical character of the terrain and camera angle from where the photograph was taken. Such a photograph requires rectification before an accurate drawing or other reproduction thereof can be made. It is therefore another object of the subject invention to provide a selectively rectified display of the photograph.

In another aspect of the invention, it will be appreciated that when the photograph is displayed on the worktable it would be convenient to manipulate movement of the projector from a location proximate the working surface, thereby obviating the need for negotiating the distance therebetween on a trail and error basis. It is therefore still another object of the subject invention to provide manipulation of a remotely located projector from a location proximate the worktable.

In various known rectifying devices the projector is vertically disposed and supported overhead of the working surface. When such devices are utilized for tracing, the image is directly displayed on the first surface intercepting the directed light beam which in some instances could be the draftsman himself or his tools of the trade, i.e., drafting instruments and the like. In the subject invention, on the other hand, the projector is remotely located horizontally from the work surface, with the display being provided indirectly by reflection. Consequently, the display beam is uninterrupted by movement of the draftsman's arms, drawing instruments, etc. It is therefore another object of the subject invention to reflect the display whereby the projector beam is unobstructed by normal working operations.

Other objects, features and advantagess of the subject invention will become apparent from the following detailed description taken in conjunction with the accompanying drawings:

BRIEF DESCRIPTION OF THE DRAWINGS

FIG. 1 is an elevated perspective view of a worktable in accordance with the subject invention; including a diagrammatic representation of a projector and projector support carriage;

FIG. 2 is a side elevation of the drafting table illustrated in FIG. 1;

FIG. 3 is a fragmentary cross-sectional elevation of the worktable illustrated in FIG. 1 taken on the lines 3—3 thereof;

FIG. 4 is another fragmentary cross-sectional elevation of the worktable illustrated in FIG. 1 taken on the lines 4—4 thereof;

FIG. 5 is an end elevational view of the projector and the projector support carriage;

FIG. 6 is a side elevational view of the projector and the projector support carriage illustrated in FIG. 5, taken in the direction of the arrow 6; and FIG. 7 is a plan view of the control box for manipulating movement of the carriage and/or the projector.

DETAILED DESCRIPTION OF THE PREFERRED EMBODIMENT

With reference now to FIG. 1 of the drawings, the subject invention is comprised of a worktable 10 and a photographic transparency projector 12, commonly known as a "slide" projector, the latter of which is supported on a selectively movable stand or carriage 14, which will hereinafter be described in detail. The worktable 10 includes a drafting board 16 adjustably supported by a pair of Y-shaped leg members 18 and 20. The drawing board 16 has a rectangularly shaped opening 26 which includes an enlarged groove 24 (see FIG. 4) for flushly receiving a transparent window 22. The window 22 may be constructed of glass or a suitable plastic material and is adapted to display a photographic image projected thereto from the projector 12, as will hereinafter be explained.

The board 16 is adjustably connected to each off the leg members 18 and 20 by means of a semi-annular bracket 28 which defines a circular slot 30. Each of the slots 30 is engaged by a suitable connector, such as a bolt 32, threadably engaged to an appropriate knob or wing nut 34. Thus, the board 16 may be suitably tilted or pivoted about a generally horizontal axis to suit the convenience of the draftsman, photo operator, or the like.

In order to transmit the image of a photographic transparency or slide from the projector 12 to the transparent window 22, a reflection panel 36 is angularly located below the drafting board 16 and pivotally connected along one edge thereof to the board 16 by means of suitable hinge members 38 (see FIG. 2). A fragmentary portion of the reflection surface is illustrated in FIG. 3 and will be seen to be comprised of a glass or plastic panel 37 having a mirrored surface 40 disposed on its upper side. This is an important feature of the subject invention because the image from the projector 12 is directly reflected from the surface 40 to the window 22; as opposed to being reflected first through the panel 36 and then reflected by the surface 40, as would occur if a conventional back surfaced "mirror" were used for reflecting the photographic image. The latter construction, would have a tendency to display the image as well as a "ghost" of the image due to some of the light being directly reflected from the panel surface while the remaining light is refracted.

The angle defined between the board 16 and the panel 36 is selectively adjustable by manual rotation of a feed screw 42 threadably connected to a four bar "scissor" linkage 44. As seen in FIG. 2, the linkage 44 is comprised of a pair of spaced oppositely threaded couplings 46 and 48 pivotably connected to opposite ends of the linkage 44 with the intermediary ends being pivotably connected to a support bracket 50 disposed on the underside of the panel 36 and a brace 52 which extends between the leg members 18 and 20, respectively. By virtue of the geometry of the linkage 44, rotation of the feed screw will displace the panel 36 upwardly or downwardly and thereby effect the angle of incidence of the light beam emitted from the projector 12.

The image from the projector 12 is also subject to being selectively displaced through movement of the projector carriage 14 and/or the projector. In this regard, the stand 14 is subject to the selective displacement in the "X," "Y," and "Z" directions, as well as rotatable relative to the "Y" and "Z" axes. For purposes of definition and clarity, the "X," "Y," and "Z" directions are defined in a directional diagram in FIG. 1 indicated generally by the numeral 54.

As best seen in FIGS. 5 and 6, the projector carriage 14 is comprised of a rectangular shaped chasis 56 movably supported by two pair of ground or other work surface contacting wheels or rollers 58, 60 arranged at the opposite ends of the chasis 56. If desired, a pair of U-shaped hand rails 61 may be provided at the opposite ends of the chasis 56 to facilitate manual positioning thereof. The pair of wheels 60 located at the right end of the chasis 56, as viewed in FIG. 5, are drivingly interconnected by an axle member 62 carrying a sprocket 64. The sprocket 64 is drivingly connected to a reversible electric motor 66 via a suitable chain, belt or other endless drive element 68. The direction of rotation of the drive or output shaft and hence the sprocket 64, axle member 62 and wheels 60 is selectively controlled from a control box 70 located on the drafting board 16 and including a conductor 71 for connecting the box 70 to a suitable electrical power source. The details of the control box 70 shall hereafter be described in more particular detail.

The chasis 56 includes a pair of transversely extending, spaced parallel, angle iron members 72 and 74 which define a track or guideway for a movable platform 76. The platform 76 is supported by a pair of axle members 78 and 80 having pairs of wheels or rollers 82 located on opposite ends thereof and laterally confined between the members 72 and 74. The axle 78 carries a sprocket 84 which is drivingly connected to another reversible electric motor 86 via a suitable chain or equivalent drive element 88, the motor 86, as well as the aforementioned motor 66, being operatively connected via a multiple conductor electrical control cable 90 to the control box 70. The platform 76 operatively carries or supports a motor mounting bracket 92 and a vertically upwardly extending support post or column 94, the former of which in turn operatively supports the motor 86 in a manner well known in the art.

A vertically extending sleeve 96 is slidably located on the post 94 and supports a reversible electric motor 98 on its upper end. The motor 98 is drivingly connected to a vertically extending feed screw (not shown) which engages a threaded coupling located in the post 94, whereby selective rotational movement of the feed screw will effect vertical displacement of the sleeve 96 along the post 94.

The sleeve 96 is fixedly connected to the apex of an L-shaped support bracket 100, the bracket 100 being rigidified by a suitable reinforcing member 102. The bracket 100 is operatively connected to a motor mounting bracket 104 and rotatably supports a gear member 106 having an integral, elongated rod portion 108. A reversible electric motor 110 is supported by the bracket 104 and is drivingly connected to the gear member 106 via a worm gear 112. The upper end of the rod portion 108 is slidably connected via a pin 113 to a horizontally extending slot 114 defined in a vertical face 116 of a horizontally extending lower projector support platform 118. As best seen in FIG. 5, the support platform 118 is pivotably connected to the support bracket 100 by a pair of hinge members 120 and 122. The electric motor 110 is also operatively connected to the control box 70 via the control cable 90, and is adapted to pivotably locate the lower support platform 118 relative to the "Y" axis for rectification of the image, as will hereinafter be explained.

The lower support platform 118 rotatably supports a turntable 124 whereon the projector 12 is immovably located. The turntable 124 includes a plurality of circumferentially disposed gear teeth 126 which are drivingly engaged with a reversible electric motor 128 via a suitable drive gear 130. The electric motor 128 is mounted on a side face of the support platform 118 and operatively connected to the control box 70 via a conductor 132 constituting part of the cable 90. Rotation of the drive gear 130 is adapted to rotate the projector 12 relative to the "Z" axis which also serves to rectify the image, as will be explained in the operation of the carriage 14.

The slide projector 12 may be of any conventional design and comprises, for example, a rotatable turret housing 134 adapted to receive one or more aerial photographic slides, the turret 134 being rotatably supported upon a projector housing 135 which includes an adjustable or "zoom" lens 136. The zoom lens 136 is adapted for use in placing the projected image exactly to scale as opposed to movement of the carriage 76 which only approximates scale obtainment. The zoom lens 136 is adjustable by actuation of a zoom lens control motor 138, also controlled remotely from the control box 70 via the control cable 90. With respect to the reversible electric motors 66, 86, 110, 128, 138, and 98, it will be noted that they may be either alternating current (AC) or direct current (DC) type motors. Because of commerical availability, direct current motors were utilized in the system illustrated in FIGS. 5 and 6, the system further comprising a storage battery 140 for providing the DC current and a battery charger 142 for maintaining the desired energy level thereof.

Turning now to the control box 70, and as best seen in FIG. 7, projector and battery charger on/off switches are indicated at 144 and 146, respectively. A rotatable projector lamp dimmer switch is indicated at 148 adjacent a pair of slide change buttons 150 and a focus button 152. A three position toggle type, zoom lens control switch having a center deactivated position is indicated at 154. The remaining five switches disposed in the control box 70 are of the three-position type including a center deactuated position, and are adapted for selectively operating the reversible electric motors. The three-position switches are indicated by 156, 158, 160, 162 and 164 and are respectively operatively connected via the cable 90 to the reversible electric motors 66, 86, 110, 128, and 98.

To operate the apparatus of the subject photo projection drawing board, the drafting board 16 is initially conveniently tilted via release of the wing nuts 34 to accommodate a comfortable working position of the draftsman on the left side of the worktable 10 as viewed in FIG. 1. The reflection panel 36 is then suitably adjusted by rotation of the feed screw 42 to define a plane approximately 45° with the drawing board 16. The projector carriage 14 carrying the slide projector 12 initially is manually located traversely with the worktable 10 so that the lens 136 will be substantially centrally directed toward the reflecting surface 40. As an aid in manually locating the carriage 14 relative to the reflecting panel 36 for centrally displaying the image, the projector may be turned on via the switch 144 to emit a rectangularly shaped light beam from the lens 136 to the transparent window 22 by reflection off of the surface 40. Now with the slide of an aerial photograph inserted in the turret housing 134 of the slide projector 12, the turret is rotated via one of the switches 150 to display the image on the slide to the transparent window 22 to effectively center the display relative to the "Y" direction. In this regard it will be noted that the switch 156 may be manually manipulated to energize the reversible electric motor 66 whereby the carriage 14 can be selectively located. Having now suitably centered the display relative to the "Y" direction, a selected scale of the display can be accomplished by movement of projector 12 in the "X" direction, by manipulation of the horizontal control switch 158. The switch 158 energizes the reversible electric motor 86 to displace the platform 76 and consequently the projector 12 in the "X" direction whereby the display will attain a preselected scale. Now having the display at the preselected scale, the image may again be readjusted centrally relative to the "X" direction by vertical movement of the projector 12 through manipulation of the vertical control switch 164 which actuates the reversible electric motor 98.

Should it be determined that a paralax distortion exists in the display of the aerial photograph, the paralax distortion may be corrected through simultaneous rotation and displacement to the projector 12. Assume, for example, that the paralax distortion is in the form of a convergence in the "X" direction of the displayed image. This can be corrected by rotation of the projector relative to the "Y" axis via the tilt control switch 160 and thereafter recentering the displayed image through vertical movement of the projector 12 via the vertical control switch 164. Correspondingly, should the distorted paralax of the displayed image be in the "Y" direction, the projector 12 may be selectively rotated by manipulation of the control switch 162 and thereafter recentered through horizontal movement of the projector 12 via the control switch 156. Thus, it will be seen that any distortion on the aerial photograph may readily be removed by proper alignment of the projector 12 via manipulation of the various controls of the control box 70. Having now a correct display of the aerial photograph, the display may be readily traced by the draftsman or alternatively be reproduced by means of light sensitive paper. In this regard it will be noted that the intensity of the beam is adjustable through the dimmer switch 148 and the depth of field through adjustment of a variable size and circular aperture 139 disposed in front of the projector lens 136. The purpose of the aperture 139 is to intercept the image rays directed through the outer edge of the lens 136. The outer rays are the ones that restrict depth of field. Consequently, the smaller the circular aperture, the greater the depth of field with a sacrifice of image illumination. As will be appreciated, without the variable aperture 139, the entire image would be in focus only if no rectification was required. By positioning the projector to rectify the paralax around the "X" or "Z" axis creates a varying length of the projector rays in the same picture. This creates the inability to focus the entire picture on the working surface at the same time. Since this feature is not desirable, the variable circular aperture is necessary.

While it will be apparent that the preferred embodiment of the invention disclosed herein is well calculated to fulfill the objects above stated, it will be appreciated that the invention is susceptible to modification, variation, and change without departing from the proper scope or fair meaning of the subjoined claims.

What is claimed is:

1. Apparatus for displaying an aerial photograph from a projector having a zoom lens to a working surface comprising:

a table for adjustably supporting said working surface;

a transparent panel located in said working surface;

a reflecting means located beneath said working surface and supported for pivotal movement by said table adjacent an edge thereof, said reflecting means including a reflecting surface located on an outer side of a support to reflect the image from said projector directly to said transparent panel without refraction thereof;

an actuating mechanism connected to said reflecting means beneath said transparent panel for locating said reflecting means in a selective angular position relative to the plane of said working surface, said actuating mechanism including operating means easily accessible from the edge of the table to which said reflecting means is attached;

a carriage adapted for movably supporting said projector relative to said working surface, said carriage including a chassis longitudinally spaced from said working surface and supported for movement in a direction generally toward said working surface, first power actuated drive means for displacing said chassis in said direction, first platform means supported on an upper surface of said chassis for movement in a generally lateral direction relative to said first direction, second power actuated drive means for selectively displacing said first platform means relative to said chassis, an uprightly extending post having a lower end connected to said first platform means, a sleeve supported for reciprocal vertical movement on said post, third power actuated drive means for selectively raising and lowering said sleeve relative to said post, second platform means pivotably connected to said sleeve, fourth power actuated drive means for selectively pivoting said second platform means, turntable means having an upper surface for supporting said projector and rotatably supported by said second platform means, and fifth power actuated drive means for selectively rotating said turntable means; a projector mounted on said upper surface of said turntable means with the optical axis of said projector and zoom lens thereof generally directed to said reflecting surface for reflecting an image projected by said projector unto said transparent panel remote control operating means situated on said working surface for selectively operating said first, second, third, fourth and fifth power actuated drive means and said zoom lens whereby said aerial photograph can be rectified in each of said longitudinal and said lateral directions.

* * * * *